Patented Oct. 6, 1925.

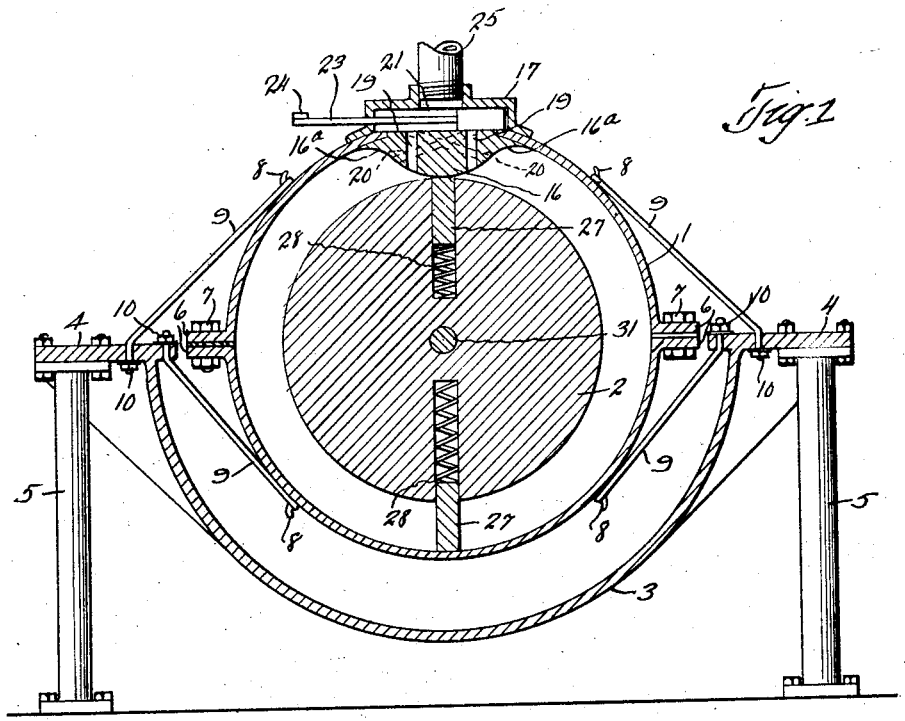

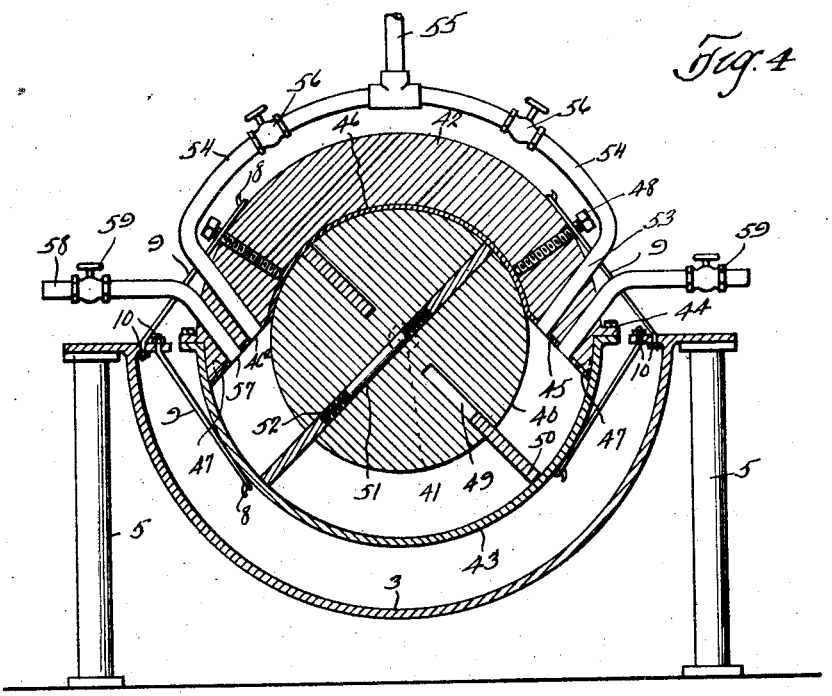

1,556,315

UNITED STATES PATENT OFFICE.

THOMAS DRENNAN, OF CROTON, ONTARIO, CANADA.

ROTARY ENGINE.

Application filed January 17, 1920, Serial No. 352,177. Renewed February 12, 1925.

*To all whom it may concern:*

Be it known that I, THOMAS DRENNAN, a subject of the King of Great Britain, residing at Croton, Province of Ontario, Canada, have invented a new and useful Rotary Engine; and I do hereby declare the following to be a full, clear, and exact description of the invention, such as will enable others skilled in the art to which it appertains to make and use the same.

The present invention relates to certain new and useful improvements in rotary engines, and has for its object to provide a device of this character which embodies novel features of construction whereby the energy of the expansible fluid medium will be utilized in an economical and effective manner.

Further objects of the invention are to provide a device of this character which is comparatively simple and inexpensive in its construction, which can be readily assembled or taken apart, which can be readily reversed for causing the rotor to turn in either direction, and which is efficient in operation.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a transverse sectional view through a rotary engine constructed in accordance with the invention.

Figure 2 is a longitudinal sectional view through the same.

Figure 3 is a detail view of the valve mechanism.

Figure 4 is a transverse sectional view through a rotary engine having a modified construction.

Figure 5 is a similar view showing a still further modification.

Corresponding and like parts are referred to in the following description and indicated in all the views of the drawings by the same reference characters.

Referring to the drawings, which illustrate one embodiment of the invention, the numeral 1 designates a cylindrical casing and 2 a rotor which is mounted within the casing. The casing is horizontally disposed and mounted over a concave bed plate 3. This bed plate 3 is connected at its ends to supporting plates 4 which are shown as secured to standards 5. The cylindrical casing 1 is shown as formed in complemental sections which have the meeting edges thereof flanged at 6 and rigidly connected by bolts 7. Opposite sides of the casing 1 are provided with the upper and lower hooks 8 which are engaged by the ends of tie rods 9. The opposite ends of these tie rods pass loosely through openings in the plates 4 and are threaded to receive nuts 10. With this construction it will be obvious that by tightening these nuts 10 the tie rods 9 can be placed under tension and the cylindrical casing 1 rigidly supported in position over the concave bed 3.

The rotor 2 is provided at opposite ends thereof with flanges 11, the edges of the flanges being provided with grooves receiving packing 12 which forms a tight joint with the cylindrical casing. The ends of the flanges 11 are also provided with outstanding ribs 13 which are received within rabbeted edge portions of retaining rings 14, said rings being fitted removably within the ends of the cylindrical casing and held in position therein by suitable fastening members 15. It will be obvious that when one of these retaining rings 14 is removed the rotor can be slipped in the cylindrical casing or removed therefrom. When the rotor is in operative position the packing 12 and interlocking relation of the ribs 13 and retaining rings 14 provide a tight joint between the rotor and the walls of the casing.

The top of the cylindrical casing 1 is provided with an abutment 16 which projects downwardly therefrom into engagement with the periphery of the rotor, the ends of the abutment being curved or inclined outwardly in opposite directions, as indicated at 16ª. Mounted upon the exterior of the casing 1 at the top thereof is a steam chest 17 and an exhaust chest 18. A pair of passages 19 extend downwardly from the steam chest 17 through the abutment 16 on opposite sides thereof, and in a similar manner a pair of passages 20 extend downwardly from the exhaust chest 18 through the abutment 16. It will be noted, however, that the exhaust passages 20 are inclined in opposite directions so that they cross each other, while the feed passages 19 extend downwardly in substantially straight lines. A slide valve 21 is mounted in the steam chest 17 for the purpose of closing either of the passages 19, thereby providing for supplying live steam or other fluid pressure medium to either side of the abutment, depending upon whether it is desired to drive the rotor in a clockwise or counter-clockwise direction. A similar slide valve 22 is provided in the exhaust chest for the purpose of closing either of the exhaust passages 20 depending upon the direction in which the rotor is turning. The two slide valves 21 and 22 are connected by arms 23 to a handle 24 so that they can be moved in unison, and it will be obvious that owing to the fact that the exhaust passages 20 are inclined in opposite directions and cross each other, the valves 21 and 22 can be properly positioned with relation to each other by moving them in the same direction through the medium of the handle 24. A steam supply pipe 25 communicates with the steam chest 17, while an exhaust pipe 26 communicates with the exhaust chest 18.

The rotor 2 is recessed at diametrically opposite points to receive sliding pistons 27, said pistons being normally forced outwardly into engagement with the walls of the casing 1 by springs 28. However, when either of the pistons passes the abutment 16 it will be moved inwardly against the action of the springs 28 by engagement with the inclined end thereof. As soon as the piston has passed the abutment it will be moved outwardly into operative position by the action of the springs 18 so that the fluid pressure medium entering the interior of the casing between the piston and the abutment will act upon the abutment to rotate the rotor. The edges of the sliding pistons 27 are shown as grooved and slidably receiving packing strips 29 which are normally pressed outwardly by the springs 30. These packing strips are thus held in a frictional engagement with the adjacent walls so as to produce a steam tight joint in connection therewith.

When the valves 21 and 22 are moved in one direction the steam or any other fluid pressure medium being used will enter the casing through the feed passage 19 on one side of the abutment 16 and be exhausted through the exhaust passage 20 on the opposite side of the abutment. The rotor will then be forcibly rotated in one direction by the expansive action of the steam or other fluid pressure medium. It will be obvious, however, that by reversing the position of the valves the live steam or fluid pressure medium will be supplied to the casing on the opposite side of the abutment and the direction of rotation of the rotor reversed. The rotor 2 is rigid with a shaft 31 which is journaled within bearings 32 carried by the bed plate, and this shaft may be provided with a drive pulley 33.

Referring to Figure 4 which shows a modified form of the invention, the numeral 40 designates a rotor which is substantially cylindrical in shape and which is provided at its ends with trunnions 41 by means of which it can be journaled in suitable bearings at the ends of the casing. The casing includes an upper section 42 and a lower complementary section 43, the two sections being flanged at the meeting edges thereof and connected by bolts, as indicated at 44. The upper section 42 is thicker than the lower section 43 and has the interior thereof recessed on a smaller radius of curvature than the lower casing section, inclined shoulders 45 being provided at the ends of the upper casing section. A segmental bearing plate 46 is interposed between the casing section 42 and the rotor and fits snugly against the rotor, the ends of the bearing plate being flared and secured to the inclined shoulders 45 in some suitable manner as by means of the screws 47. Pressure bolts 48 are threaded in the casing section 42 and engage the bearing plate 46 at points towards opposite ends thereof. These bolts 48 can be tightened and the bearing plate thereby caused to fit tightly against the rotor so as to prevent the steam or other fluid pressure medium from circulating around the rotor between the upper half thereof and the upper casing section 42. The rotor 40 is provided with a series of radially disposed recesses 49 within which the sliding pistons 50 are mounted. Corresponding recesses 49 on opposite sides of the rotor are connected by openings within which rods 51 are slidably mounted, springs 52 being carried by the ends of the rods and interposed between the said rods and the pistons. With this construction it will be obvious that as the rotor revolves the pistons will be forced into the recesses 49 by the cam action of the inclined shoulders 45 preparatory to passing under the upper casing section 42, although they will be projected into operative position so as to engage the lower casing section 43 as soon as they have been rotated a sufficient amount to clear the upper casing section. An inlet 53 opens through each of the shoulders 45 and these inlets are connected by branch pipes 54 to a common supply pipe 55 through which any suitable medium such as steam may be supplied to the engine. Each of the branch pipes 54 are operated with a hand valve 56 which can be properly adjusted for driving the engine in either direction. An exhaust 57 also opens through each of the inclined shoulders 45 and communicates with an exhaust pipe 58. These exhaust pipes 58 are each provided with a valve 59 which are manually operated and which are to be set in a proper relation to the valves of the inlet pipes 54 for causing the engine to feed at one side thereof and exhaust at the other side thereof. By properly setting the valves the engine can be driven in either direction. The casing is shown, as in the previous instance, as mounted over a bed plate 3 which is supported at its ends by the standards 5. Tie rods 9 engage upper and lower hooks 8 on opposite sides of the casing and pass loosely through plates 4 at the ends of the bed plate 3, being capped by the nuts 10. This supporting means is constructed and operated as previously described.

Figure 5 illustrates a further modification of the invention. The rotor 60 is keyed or otherwise secured to a shaft 61 which is suitably journaled within the end plates 62 of the casing. These end plates are shown as secured by bolts 63 to flanges 64 at the ends of a substantially cylindrical casing 65, said casing being provided with a base 66. The body of the rotor has a radius which is less than the radius of the interior of the casing, and at diametrically opposite points the rotor is provided with buckets or shoulders 67 which have cam faces, and which project outward into substantial engagement with the inner walls of the casing. Longitudinally extending packing strips 68 are slidably received within recesses 69 in the shoulders 67, and springs 70 arranged under the strips 68 normally tend to force the same outward into a yielding engagement with the walls of the casing. A swinging abutment 71 is mounted within a pocket 72 in the top of the casing, one end of the abutment being pivoted within the pocket while the other end thereof is adapted either to swing downward into engagement with the rotor 60, or upward into the pocket 72 to permit one of the buckets or shoulders 67 to pass under the same. The swinging end of the abutment 71 is provided with packing 73 which engages the segmental end wall of the pocket and forms a tight joint therewith. One or more plungers 74 engage the top of the abutment 71 and normally tend to swing the same inwardly into operative position. These plungers 74 are slidable within the tubular guides 75 and springs 76 are interposed between the plungers and plugs 77 which close the tubular guides. An inlet 78 is provided in the casing 65, at a point adjacent the swinging end of the abutment 71 while an outlet 79 is provided in the casing adjacent the pivoted end of the said abutment. A supply pipe 80 communicates with the inlet 78, and it will be obvious that any fluid pressure medium such as steam entering the casing through the inlet 78 will be confined between the abutment 71 and one of the shoulders or buckets 67 of the rotor so as to revolve the rotor. The abutment 71 will swing upwardly to admit of the shoulders or buckets 67 passing under the same, after which the abutment will be immediately forced back to operative position by action of the spring plungers.

Having thus described the invention, what I claim as new and desire to secure by Letters Patent, is:—

1. A rotary engine including a cylindrical casing, a rotor mounted therein, a concave bed arranged under the casing, supporting plates at the ends of the bed, hooks on opposite sides of the casing, and tie rods connected to the hooks and extending through the supporting plates, said tie rods cooperating with the hooks to hold the cylindrical casing in position.

2. An engine including a cylindrical casing, a rotor mounted therein, a concave bed arranged under the casing and having anchor plates at the ends thereof, hooks at opposite ends of the casing, and tie rods detachably engaging the hooks and anchor plates and cooperating therewith to support the cylindrical casing above the concave bed and in spaced relation thereto.

3. An engine including a cylindrical casing, a rotor mounted therein, a concave bed arranged under the casing and having anchor plates at the ends thereof, and opposed sets of diverging tie rods detachably connecting the anchor plates to spaced portions of the cylindrical casing and supporting the cylindrical casing above the concave bed in a spaced relation thereto.

In testimony whereof I have signed my name to this specification.

THOMAS DRENNAN.